United States Patent [19]

Sencar

[11] 4,180,447

[45] Dec. 25, 1979

[54] PROCESS FOR THE PRODUCTION OF HARD PLASTIC FOAMS USING A POLYVINYLCHLORIDE BASE

[75] Inventor: Drago Sencar, Steinhausen, Switzerland

[73] Assignee: Lonza Ltd., Gampel, Switzerland

[21] Appl. No.: 941,208

[22] Filed: Sep. 11, 1978

Related U.S. Application Data

[63] Continuation-in-part of Ser. No. 758,131, Jan. 10, 1977, abandoned.

[51] Int. Cl.$^2$ ............................................. C08F 8/00
[52] U.S. Cl. ..................... 204/159.17; 204/159.2; 521/75; 521/92; 521/134; 521/140
[58] Field of Search ................ 204/159.17, 159.2; 521/915, 140

[56] References Cited

U.S. PATENT DOCUMENTS

| 3,200,089 | 8/1965 | Landler et al. ........................ 260/2.5 |
| 3,256,217 | 6/1966 | Landler et al. ........................ 260/2.5 |
| 3,267,051 | 8/1966 | Landler et al. ........................ 260/2.5 |
| 3,308,074 | 3/1967 | Landler et al. ........................ 260/2.5 |
| 3,359,193 | 12/1967 | Pinner .............................. 204/159.17 |
| 3,708,441 | 1/1973 | Joslyn ................................. 260/2.5 P |
| 3,714,083 | 1/1973 | Nakayama et al. ............. 260/2.54 A |
| 3,717,559 | 2/1973 | Oyama et al. ..................... 204/159.17 |
| 3,817,851 | 6/1974 | Atchison et al. ................. 204/159.17 |
| 3,852,177 | 12/1974 | Atchison et al. ................. 204/159.17 |
| 3,998,715 | 12/1976 | Bohm et al. ...................... 204/159.16 |

FOREIGN PATENT DOCUMENTS

| 1068791 | 5/1967 | United Kingdom . |
| 1219803 | 1/1971 | United Kingdom . |

*Primary Examiner*—Richard B. Turer
*Attorney, Agent, or Firm*—Fisher, Christen & Sabol

[57] ABSTRACT

A process for the production of hard plastic foams, using a polyvinylchloride base, from a mixture of polyvinylchloride, at least one temporary softener and at least one expansion agent, wherein the mixture is heated, cooled and expanded. A polymerizable ethylenically unsaturated monomer having at least one double linkage is used as the softener. The polymerization of such monomer is carried out after complete expansion by means of ionizing rays.

11 Claims, No Drawings

PROCESS FOR THE PRODUCTION OF HARD PLASTIC FOAMS USING A POLYVINYLCHLORIDE BASE

This is a continuation-in-part of application Ser. No. 758,131, filed on Jan. 10, 1977 now abandoned.

BACKGROUND OF THE INVENTION

1. Field of the Invention

This invention relates to a process for the production of hard plastic foams, using a polyvinylchloride base, from a mixture of polyvinylchloride, temporary softeners and foaming agents, wherein the mixture is heated, cooled and expanded.

2. Prior Art

It is known to produce hard plastic foams from polyvinylchloride. In such case, a mixture of polyvinylchloride, foaming agent and solvent, such as acetone or toluene, which serves as a temporary softener, is molded in compression molds or processed by extrusion or injection molding and is then expanded. After complete expansion the solvent must be removed by evaporation. Such a processing step is very expensive and harmful to the environment.

It is also known to use monomers, such as, isocyanates, diisocyanates or methylmethacrylates, as temporary softeners. (See Benning, "Plastic Foams", Wiley-Interscience 1969, pp. 112 and 115.) Such monomers are converted into hard polymeric products during the heating period and/or during the expansion step, under the influence of water (in the case of isocyanate and diisoycanate) or using radial initiators in the case of methylmethacrylates.

When methylmethacrylate is used, it is difficult to achieve good uniform and sufficient expansion, as a result of the polymerization which starts under the effect of heat. The monomer is polymerized too quickly, so the softening effect, which is needed for a good expansion, is lost too quickly.

BROAD DESCRIPTION OF THE INVENTION

An object of this invention is to provide a process that eliminates the above-stated disadvantages and problems of the prior art. Other objects and advantages of this invention are set out below or are obvious to one ordinarily skilled in the art.

The process of this invention achieves the objects and advantages of this invention.

This invention involves a process wherein a polymerizable monomer, having at least one ethylenically unsaturated double linkage, is used and the polymerization of such monomer is carried out by means of ionizing rays after expansion is completed. The monomer, which acts as a softener, is used effectively in a quantity between 10 and 50 percent by weight, preferably 20 to 40 percent by weight, based on the polyvinylchloride.

Gaseous monomers, such as vinylchloride, as well as liquid monomers (which are liquid at standard temperature) may be used as the polymerizable monomer. Preferably a liquid monomer is used. Such monomers are, for example, acrylic acid, methacrylic acid, low alkyl (1 to 8 carbon atoms) esters of acrylic and/or methacrylic acid, such as, methacrylate, ethylacrylate, butylacrylate, methylmethacrylate, butyl methacrylate and alkyl-hexylacrylate, low alkyl (1 to 8 carbon atoms) esters of maleic acid, such as, monomaleic acid and dimaleic acid-methyl-, alkyl ester, acrylonitrile, methacrylonitrile, acrylic acid and/or methacrylic acid ester of glycols, such as, styrene and divinylbenzene, and allyl compounds such as, diallylphthalate.

A mixture of prepolymerizate with such polymerizable monomer is also considered as a polymerizable monomer within the scope of this invention. Polyacrylic and/or polymethacrylic acid ester, ABS polymers, polymers and mixed polymers of the above-mentioned polymerizable monomers may also be used as the prepolymerizate.

Mixtures of the polymerizable monomers can be used.

The polymerizable monomers are selected and used based on the desired characteristics of the ultimately developed plastic foam. Thus, for example, the unit weight and the toughness of the plastic foam may be varied. The foams that are produced by the process of this invention are light foams, with a foam density between 60 and 100 kg/cm$^3$, preferably 60 and 80 kg/cm$^3$.

A premature, undesirable thermal polymerization can be prevented by the additional use of inhibitors.

The polyvinylchloride mixed with polymerizable monomers and chemical or physical expansion agents, in some cases also with fillers, pigments, stabilizers, etc., is processed in accordance with known processes in compression molds, stamping molds, extruders or injection molding machines and is subsequently expanded. After complete expansion, the polymerizable monomer located in the plastic foam is polymerized by the effect of ionizing radiation.

UV rays, X-rays, gamma rays, beta particles or beams of rays of greatly accelerated electrons may be used as the ionizing radiation. Electron rays with an energy between 400 and 2000 KEV are preferably used. The radiation dose is between 3 to 15 megrad.

The type of expansion agent is of no significance in the process of this invention. Physical expansion agents, such as nitrogen, freon or pentane, as sell as chemical expanding agents, such as, azodiacarbonamide, ammonium carbonates or alkali/hydrogen/carbonate or sulfhydrazides, may be used.

By way of summary, this invention involves a process for the production of hard plastic foams, using a polyvinylchloride base, from a mixture of polyvinylchloride, at least one temporary softener and at least one expansion (foaming) agent, wherein the mixture is heated, cooled and expanded. A polymerizable ethylenically unsaturated monomer having at least one double linkage is used as the softener. The polymerization of such monomer is carried out after complete expansion by means of ionizing rays.

DETAILED DESCRIPTION OF THIS INVENTION

As used herein, all parts, percentages and ratios are on a weight basis unless otherwise stated or otherwise obvious to one ordinarily skilled in the art.

EXAMPLE 1

100 parts of PVC (polyvinyl chloride) were mixed with 10 parts of CaCO$_3$, 5 parts of dythal (dibasic lead phthalate), 20 parts of ammonium hydrogen carbonate and 30 parts of methylmethacrylate. The compound was heated in a compression mold at a pressure of 250 kg/cm$^2$ to 166° C. and was kept at this temperature for one half hour. Subsequently, is was cooled and the blank was removed from the mold. The expansion of the blank was carried out in a drying cabinet at about 100° C. until a density of 70 kg/m³ was reached. The completely expanded foam plastic was then treated by means of accelerated electrons having an average energy of 400 KEV (radiation intensity: 1 to 3 megrade/sec.). At the same time the methylmethacrylate polymerized. The complete foam plastic was tough-elastic and had a unit weight of 70 kg/cm³.

EXAMPLE 2

Two samples of foamed polyvinylchloride was prepared using the following ingredients:
100 parts of polyvinylchloride
10 parts of $CaCO_3$
3 parts of lead carbonate
1 part of lead stearate
1 part pigment
35 parts of methylmethacrylate
0.1 part of hydroquinone The two samples were termed sample 1 and sample 2, respectively.

Sample 1 was irradiated with electrons (after being removed from the mold) and was then heated to expansion at 100° C. Sample 2 was first expanded at 110° C. and then was irradiated with electrons. In both cases, the dosage was 10 Mrad.

After the irradiation, Sample 1 showed no additional expansion. Sample 1 had a density of approximately 250 kg/cm³. Sample 2 had a density of 60 kg/cm³. Sample 1 represents the prior art; Sample 2 represents this invention.

Sample 1 had a strong discoloration.

Sample 1 was irradiated first and then expanded by heating to 110° C. Sample 2 was first expanded by heating to 110° C. and then irradiated. (The ingredients used in each sample were the same.) Sample 1 showed essentially no expansion, whereas Sample 2 showed a good foamed product with uniform cells.

When polyvinylchloride is heated after irradiation, a strong discoloration unexpectedly takes place (as with Sample 1), which can result in the making of unusable products. The discoloration is probably attributed to the formation of conjugate double bonds—that is, splitting off the hydrochloric acid. The properties of such products also deteriorate correspondingly. The formation of the conjugate double bonds is caused by the long-lived radicals which are present in polyvinylchloride after the irradiation.

For these reasons, the sequence in the manufacturing of polyvinylchloride foam material is critical. Expansion followed by irradiation is decisive in obtaining usuable polyvinylchloride foam materials having a density under 100 kg/cm³.

EXAMPLE 3

Two samples of foamed polyvinylchloride were prepared using the following ingredients:
100 parts of polyvinylchloride
10 parts of $CaCO_3$
3 parts of lead carbonate
1 part of lead stearate
1 part of pigment
35 parts of methylmethacrylate
0.1 part of hydroquinone The two samples were termed Sample A and Sample B, respectively.

Each sample was placed in a compression mold and nitrogen gas was added to the mold until a pressure of 20 atmospheres was achieved in the mold. Each sample in the mold was heated under a pressure of 250 kg/cm³ to 160° C., and kept at such temperature for 30 minutes. After cooling, each sample was removed from the mold and subsequently expanded at 120° C.

For hardening, foamed Sample A was exposed to ionizing rays having an intensity of 3 Mrad. The foamed (plastic) Sample A had a vicat-temperature of 60° C.

The same hardening procedure was done to Sample B at a radiation intensity of 15 Mrad. The foamed (plastic) Sample B had a vicat-temperature of 90° C.

What is claimed is:

1. A process for the production of hard plastic foam, using a polyvinylchloride base, from a mixture of polyvinylchloride, at least one temporary softener and at least one expansion agent, wherein the mixture is heated, cooled and expanded, the improvement consisting of using at least one polymerizable ethylenically unsaturated monomer having at least one double linkage as a softener and conducting the polymerization of said polymerizable monomer, after completion of the expansions, by means of ionizing rays, the dosage of the ionizing rays being between 3 and 15 megarads.

2. A process as described in claim 1 wherein said polymerizable monomers are used in a quantity of 10 to 50 percent by weight, based on the polyvinylchloride.

3. A process as described in claim 1 where said polymerizable monomer is a lower alkyl ester of acrylic acid and/or methacrylic acid.

4. A process as described in claim 1 wherein said polymerizable monomer is an acrylic acid ester and/or methacrylic acid esters of glycol.

5. A process as described in claim 1 wherein said polymerizable monomer is a vinyl compound.

6. A process as described in claim 1 wherein said polymerizable monomer is an allyl compound.

7. A process as described in claim 1 wherein a mixture of a prepolymer in said polymerizable monomer is used as said polymerizable monomer.

8. A process as described in claim 1 wherein electron rays are used as said ionizing rays.

9. A process as described in claim 1 wherein the radiation dosage of the ionizing rays is between 3 and 15 megrads.

10. A process as described in claim 1 wherein the hard plastic foam has a foam density between 60 and 100 kg/cm³.

11. A process as described in claim 1 wherein the hard plastic foam has a foam density between 60 and 80 kg/cm³.

* * * * *